(12) United States Patent
Scott (10) Patent No.: US 10,622,112 B2
(45) Date of Patent: Apr. 14, 2020

(54) CONVERSION OF SPENT URANIUM OXIDE FUEL INTO MOLTEN SALT REACTOR FUEL

(71) Applicant: Ian Richard Scott, Warwickshire (GB)

(72) Inventor: Ian Richard Scott, Warwickshire (GB)

( * ) Notice: Subject to any disclaimer, the term of this patent is extended or adjusted under 35 U.S.C. 154(b) by 0 days.

(21) Appl. No.: 16/085,568

(22) PCT Filed: Mar. 14, 2017

(86) PCT No.: PCT/GB2017/050684
§ 371 (c)(1),
(2) Date: Sep. 15, 2018

(87) PCT Pub. No.: WO2017/158335
PCT Pub. Date: Sep. 21, 2017

(65) Prior Publication Data
US 2020/0027601 A1 Jan. 23, 2020

(30) Foreign Application Priority Data

Mar. 16, 2016 (GB) .................................. 1604459.6
Sep. 14, 2016 (GB) .................................. 1615592.1

(51) Int. Cl.
*C25C 3/34* (2006.01)
*C25C 3/36* (2006.01)
(Continued)

(52) U.S. Cl.
CPC ................ *G21C 19/48* (2013.01); *C25C 3/34* (2013.01); *C25C 3/36* (2013.01); *C25C 7/005* (2013.01);
(Continued)

(58) Field of Classification Search
CPC .... C25C 3/34; C25C 3/36; C25D 3/66; C25D 21/18
See application file for complete search history.

(56) References Cited

U.S. PATENT DOCUMENTS 2,902,415 A 9/1959 Niedrach
3,052,611 A 9/1962 Piper
(Continued)

FOREIGN PATENT DOCUMENTS

DE 38 37 572 A1 5/1989
EP 0379565 A4 1/1990
(Continued)

OTHER PUBLICATIONS

International Search Report for corresponding App. No. PCT/GB2017/050684, dated Jul. 6, 2017.
(Continued)

*Primary Examiner* — Brian W Cohen
(74) *Attorney, Agent, or Firm* — Renner, Otto, Boisselle & Sklar, LLP (57) ABSTRACT

There is described a method of reprocessing spent nuclear fuel. The spent nuclear fuel is added to an electro-reduction cell containing a halide salt electrolyte at a temperature above the melting point of the metallic form of uranium and higher actinides present in the spent nuclear fuel. The cell is operated so as to electrochemically reduce the spent nuclear fuel to an alloy of uranium and higher actinides present in the spent nuclear fuel, wherein electrochemical reduction is continued until a concentration of unreduced components of the spent nuclear fuel is sufficiently low for the ahoy to agglomerate.

17 Claims, 3 Drawing Sheets

(51) Int. Cl.
- *C25C 7/06* (2006.01)
- *G21C 19/48* (2006.01)
- *C25C 7/08* (2006.01)
- *C25C 7/00* (2006.01)
- *C25C 7/02* (2006.01)
- *C25D 3/66* (2006.01)
- *C25D 21/18* (2006.01)

(52) U.S. Cl.
CPC ............... *C25C 7/08* (2013.01); *C25C 7/025* (2013.01); *C25D 3/66* (2013.01); *C25D 21/18* (2013.01)

(56) References Cited

U.S. PATENT DOCUMENTS

| | | | |
|---|---|---|---|
| 4,814,046 A | 3/1989 | Johnson | |
| 4,880,506 A | 11/1989 | Ackerman | |
| 5,141,723 A | 8/1992 | Miller | |
| 8,506,786 B2 * | 8/2013 | Shim | C25C 3/34 205/43 |

FOREIGN PATENT DOCUMENTS

| | | |
|---|---|---|
| EP | 2 657 942 A1 | 10/2013 |
| GB | 862860 A | 3/1961 |
| JP | 07333389 A | 12/1995 |
| JP | 09228089 A | 9/1997 |
| JP | 11218597 A | 8/1999 |
| JP | 2000284090 A | 10/2000 |
| KR | 101513652 B1 | 4/2015 |
| WO | 02/099815 A2 | 12/2002 |

OTHER PUBLICATIONS

International Preliminary Report on Patentability for corresponding App. No. PCT/GB2017/050684, dated Mar. 8, 2018.
Search Report for corresponding GB App. No. 1604459.6, dated Oct. 11, 2016.
Search Report for corresponding GB App. No. 1615592.1, dated Feb. 7, 2017.
Choi and Jeong, Electrochemical processing of spent nuclear fuels; An overview of oxide reduction in pyroprocessing technology, Progress in Natural Science: Materials International 25(2015)572-582 (cited in Specification).
OECD/NEA Pyrochemical separations in nuclear applications, a status report, ISBN 92-64-02071-3 (cited in Specification).
Kinoshita et al, Separation of Uranium and Transuranic Elements from Rare Earth Elements by Means of Multistage Extraction in LiCl-KCl/Bi System, J. Nuclear Science and Technology, 36:2. 189-197 (cited in Specification).

* cited by examiner

CONVERSION OF SPENT URANIUM OXIDE FUEL INTO MOLTEN SALT REACTOR FUEL

FIELD OF THE INVENTION

The invention relates to the reprocessing of spent nuclear fuel and to the production of molten salt fissile fuel for a nuclear reactor.

BACKGROUND

Conventional reprocessing of spent nuclear fuel from nuclear reactors is a complex and expensive process. There has been substantial interest in developing so called pyro-processing methods that could have lower cost and produce plutonium of relatively low purity, Such low purity plutonium would have applications in molten salt reactors where purity is less critical than in conventionally fuelled reactors.

The processes for pyro-processing separation of uranium and plutonium in spent uranium oxide fuel typically requires conversion of the fuel to metallic form.

The industrially standard way to convert uranium or other actinide oxides to metal is the thermite reaction where the oxide reacts exothermally with calcium metal forming calcium oxide and the actinide metal. This has the drawback of creating large amounts of radioactively contaminated calcium oxide.

A second method which has been studied is the electrochemical reduction of the oxide in an electrolyte by the so called "Cambridge FFC process". This reduces the solid oxide to solid metal in situ and is commercially used in producing refractory metals. Attempts to use it for spent nuclear fuel have however been frustrated by incomplete reduction of the oxides leading to contamination of subsequent stages in the process with the oxides (Choi and Jeong, Progress in Natural Science: Materials International 25 (2015) 572-582).

A third method was attempted by the US Atomic Energy Commission in the 1960's (Piper, U.S. Pat. No. 3,052,611) where electrochemical reduction of uranium oxide in an electrolyte above the melting point of uranium metal was designed to produce a pure molten uranium metal continuously from an electrochemical reducer—a similar process to that used to smelt aluminium, Unfortunately, this was relatively unsuccessful as the uranium failed to agglomerate, instead producing metal shot coated with uranium oxide. Attempts to overcome this drawback by mixing graphite with the uranium oxide were unsuccessful due to contamination of the uranium with carbon. Further attempts by Mitsubishi in the 1990's led to the need for use of a second lighter molten alloy floating on the molten uranium to prevent contamination of the uranium with oxide (JPH09228089 (A)—1997 Sep. 2002). Since all metals have some solubility in molten uranium this also led to contamination of the uranium metal.

Once conversion of oxide to metal is done, the separation of uranium, other actinides and other metals can be carried out by two processes.

The first is electrochemically, as pioneered at Argonne National Laboratory (OECD/NEA Pyrochemical separations in nuclear applications ISBN 92-64-02071-3). In this process uranium is first electrochemically transferred from an impure metallic anode to an iron cathode where high purity uranium is deposited in a dendritic form. Other actinides remain in the electrolyte and are then transferred by continuing electrolysis into a molten cadmium or bismuth cathode. A major drawback of this process is the dendritic form of the uranium which means it has to be physically transferred from the electrolysis cell with risk of dendrites breaking off and inevitable substantial contamination of the uranium with the electrolyte trapped between and within the dendrites. Extra steps to purify the dendritic uranium are therefore needed.

The second process (eg Kinoshita et al, J. Nuclear Science and Technology, 36:2. 189-197) involves partitioning the impure metal between a low melting point metal such as cadmium or bismuth and a molten salt. Separation is based on the different partitioning behaviour of the different metals in such systems. This approach carries substantial complexity however as recovery of the actinides from the bismuth or cadmium is required and the low solubility of uranium in such metals requires relatively large volumes to be used.

Both of these processes, as so far devised, are complex and involve many stages. None have been commercialised. There remains a need therefore for a simple method of achieving the conversion of spent uranium oxide based reactor fuel into fuel for advanced reactors and especially for molten salt reactors.

SUMMARY

In accordance with one aspect of the present invention there is provided a method of reprocessing spent nuclear fuel. The method comprises adding the spent nuclear fuel to an electro-reduction cell containing a halide salt electrolyte at a temperature above the melting point of the metallic form of uranium and higher actinides present in the spent nuclear fuel; and electrochemically reducing the spent nuclear fuel to form an alloy of uranium and higher actinides present in the spent nuclear fuel, wherein electrochemical reduction is continued until a concentration of unreduced components of the spent nuclear fuel is sufficiently low for the alloy to agglomerate.

The spent nuclear fuel may comprise one or more of uranium oxide, plutonium oxide, uranium metals and actinide halide salts.

The method may further comprise removing the molten alloy from the electro-reduction cell. Optionally the removal takes place only following sufficient electrochemical reduction such that at least a quarter of plutonium initially present in the spent nuclear fuel is in the molten alloy.

Following removal of the molten alloy from the cell, it may be counter-flowed against and in contact with a molten salt comprising a uranium halide so as to form a molten salt fissile fuel, optionally in a counter-current exchanger. Alternatively, contact between the molten salt and uranium halide may be carried out in a batch process. The flow rates of the molten alloy and molten salt may be such that the number of moles of uranium halide in the molten salt passing through the process in a unit time is greater than the number of moles of higher actinides plus lanthanides in the molten alloy passing through the process in a unit time.

The molten salt comprising uranium halide may consist of 60% sodium halide and 40% uranium halide, wherein the uranium halide is natural uranium.

The steps of adding the spent nuclear fuel, electrochemically reducing the spent nuclear fuel and removing the molten alloy from the electro-reduction cell may be performed multiple times using the same electrolyte.

Exhaustive electrolysis may be performed in order to eliminate actinides from the electrolyte following a final step of electrochemically reducing the spent nuclear fuel, the exhaustive electrolysis resulting in an alloy comprising plutonium, americium and lanthanides. The alloy comprising plutonium, americium and lanthanides may be counter-flowed against and in contact with a molten salt which comprises uranium halide in an equivalent or lesser concentration to a concentration of lanthanides and other non-actinide metals in the alloy, such that following the contacting of the molten alloy with the molten salt, the molten salt is substantially actinide free.

The electrolyte resulting from the method above may be used as a heat source for a heat exchanger so as to generate electricity or process heat. The electrolyte may be stored within leak-proof thermally conductive containers of stainless steel or other material resistant to corrosion by molten salt, and immersed in coolant contained within a coolant tank, wherein the heat exchanger is partly immersed in said coolant. The coolant may be a molten salt, optionally a nitrite or nitrate. The size of the coolant tank may be such that each of the containers is surrounded by sufficient coolant to screen radiation emitted by the electrolyte.

In accordance with another aspect of the present invention there is provided apparatus for reprocessing spent nuclear fuel. The apparatus comprises an electro-reduction cell comprising a tank configured to contain a molten salt electrolyte; a heating system configured to maintain the tank at a temperature above a melting point of the metallic form of uranium and higher actinides present in the spent nuclear fuel; and an anode and cathode located within the tank and configured to electrochemically reduce spent nuclear fuel to form an alloy of uranium and higher actinides present in the spent nuclear fuel. The apparatus further comprises a feed configured to provide spent nuclear fuel to the electro-reduction cell; an alloy removal system configured to remove the alloy from the electro-reduction cell; and a controller configured to cause the electro-reduction cell to continue electrochemical reduction of the spent nuclear fuel to continue until a concentration of unreduced components of the spent nuclear fuel is sufficiently low for the alloy to agglomerate, and then to cause the alloy removal system to remove the alloy.

The apparatus may further comprise a counter-current exchanger configured to flow the alloy removed by the alloy removal system in one direction and flow a molten salt comprising uranium halide in the opposite direction in contact with the molten alloy.

Components which are configured to contact the uranium alloy may comprise one or more of: tantalum; tungsten; a coating of yttrium oxide; zirconium oxide; and graphite.

The anode may be formed from carbon or iridium, and may be located such that it is immersed in the alloy during use.

DETAILED DESCRIPTION

Uranium oxide based spent nuclear fuel is first reduced to metallic form in an electro-reduction cell operated above the melting point of uranium (>1132° C.). Optionally however, another metallic element such as iron may be added to the electrochemical cell so that the uranium forms a lower melting point alloy allowing the cell to operate at a lower temperature. This results however in a uranium product containing a substantial fraction of the second metallic element which may be less desirable.

Figure 1:
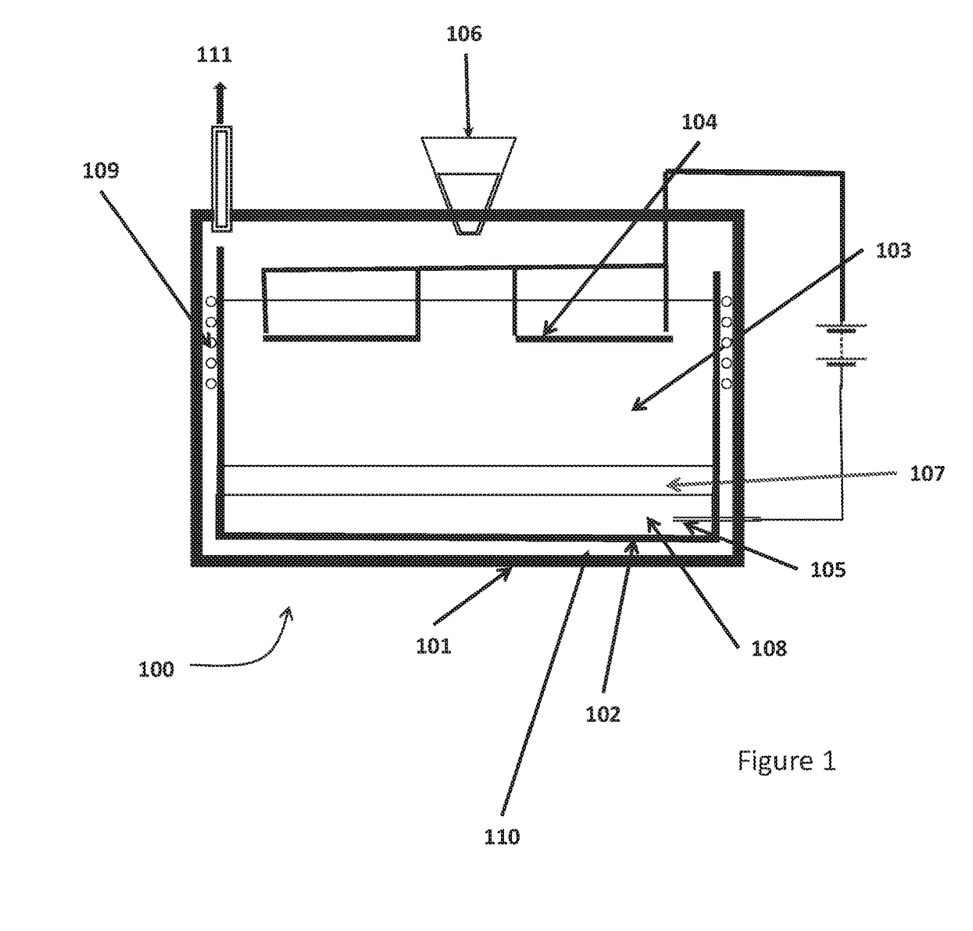
FIG. 1 is a schematic diagram of an electro-reduction cell for reducing spent nuclear fuel.

An illustrative drawing of a suitable cell 100 is shown in FIG. 1. The apparatus comprises an outer structure 101, which encloses an electrolysis tank 102. The electrolysis tank 102 contains an electrolyte 103 in which is immersed an anode 104 (preferably located towards the top of the electrolyte) and a cathode 105. Spent nuclear fuel is added from a feed 106 into the electrolyte, and forms a layer 107. As current is passed between the anode and cathode, the spent fuel is electrochemically reduced to form an alloy 108 at the cathode 105. The alloy sinks to the bottom of the tank 102, and the cathode is preferably located such that the cathode will be immersed in the alloy when it forms. The process is performed at a temperature such that the resulting alloy is molten—the temperature is controlled by means of heaters and cooling ducts 109 located within insulation 110 placed between the outer structure and the tank. The electrolysis product at the anode will generally be a gas (e.g. oxygen where the spent fuel is an oxide fuel, or a halide where the spent fuel is a molten salt fuel), and this is released via an off gas tube 111 to a condenser (not shown). The apparatus also comprises an alloy removal system (not shown) for removing the molten alloy from the electrolysis tank.

The apparatus may be used for a variety of spent nuclear fuel, e.g. uranium oxide based fuels, molten salt fissile fuels, or fuels comprising metallic uranium, but will be described in terms of a uranium oxide based fuel for ease of understanding.

While many designs of electro-reducer are possible there are a number of particularly useful aspects that may be built into the design. Construction materials which contact the molten uranium should be resistant to molten uranium over quite long time periods. Tantalum or tungsten are good options. Alternatively, the metal in contact with the uranium can be coated with yttrium oxide (yttria) which is resistant to attack by molten uranium. Application by plasma spraying is an established technique to achieve coherent and adherent coatings. Zirconium oxide can also be used either as a structural material itself or as a coating but it has somewhat inferior performance than yttria. Graphite is also a possible structural material but does react slowly with molten uranium and would result in uranium carbide contamination of the alloy produced.

The anode can be formed from graphite or other carbon material using similar technology to that used in anodes for aluminium smelters. However, the anode will then oxidise and be consumed which can result in carbide formation in the uranium alloy. Alternatives are noble metal electrodes with iridium being a particularly resistant metal for this purpose.

Pumping of molten uranium is a challenging application and it may be convenient to transfer molten alloy, and spent molten salt electrolyte, from the cell by gas pressure displacement using dip tubes. Induction or resistance heating elements can be built into the apparatus together with cooling coils for when heat generation from accumulated fission products becomes excessive. The state of reduction in the cell can be measured using electrochemical sensors in the molten salt. Mixing of the electrolyte in the cell can be achieved by convection or by use of a mechanical stirring apparatus.

This process is not operated in a continuous manner as described in U.S. Pat. No. 3,052,611 and JPH09228089, as this led to substantial problems of contamination of the uranium metal with uranium oxide and resulted in only a small fraction of the higher actinides being reduced into the alloy, Instead, uranium oxide based fuel is repeatedly added to the electro-reducing cell until the layer of molten uranium, contaminated with oxide, reaches the desired quantity, Addition of oxide is then stopped but electro-reduction continued until essentially all uranium oxide has been reduced to metal together with a large fraction of the neptunium, plutonium, americium and curium, a smaller fraction of the lanthanide fission products in the spent fuel and small amounts of the electrolyte salt. This allows the uranium alloy to agglomerate, and the reduction is continued at least long enough for this to occur. Where a calcium based electrolyte is used, the very low solubility of calcium in molten uranium limits the calcium content of the alloy to very low amounts with most reduced calcium metal dissolved in the molten salt rather than the uranium alloy.

The electrolyte salt can be any suitable salt including any of the group 1 or 2 metals in the periodic table as chlorides or fluorides. However many of the group 1 metals can be reduced in significant quantities in the electro-reduction cell and are volatile at the temperatures used, creating a problem with gas management and contamination of the uranium alloy with the group 1 or 2 metals, Calcium is a particularly good choice of electrolyte salt either as the chloride, optionally with small amounts of calcium oxide added, or as the fluoride as a lower melting point mixture with a group 1 metal fluoride.

Figure 2:
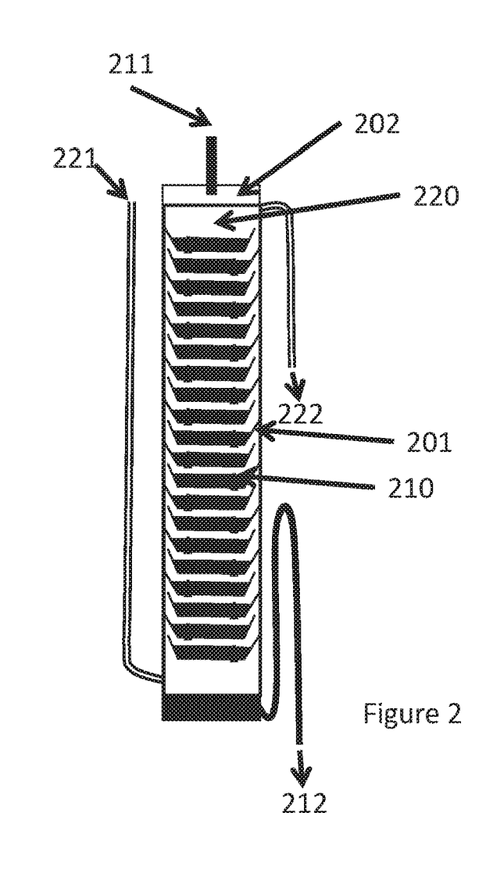
FIG. 2 is a schematic diagram of a counter-current exchanger.

The uranium alloy resulting from this process is drawn from the electro-reduction cell and passed into a molten metal/molten salt contactor where the metal and salt flow in counter-current manner, Many designs of contactor are practical, but an exemplary simple plate type column is illustrated in FIG. 2. It will be appreciated that other designs could include a spray of molten metal into a rising flow of molten salt, a screw mixed counter-current column or others known to the art.

The counter-current column of FIG. 2 comprises a molten alloy inflow 211 and outflow 212, and a molten salt inflow 221 and outflow 222, The inflows and outflows are positioned such that the molten salt 220 flows in the opposite direction to the molten alloy 210. In order to increase the contact area between the molten salt 220 and molten alloy 210, a number of trays 201 are provided, with each tray having a gap between the tray and the column wall at alternating sides, so that liquid flows in a "zig-zag" pattern up or down the column. An inert gas 202 is provided at the top of the column, to prevent any unwanted reactions with the molten salt or molten alloy, and the counter-current column is formed from a material which will not react with either the molten alloy or molten salt.

The molten salt is based on a uranium halide salt optionally modified with additional salts such as sodium chloride to reduce its melting point or concentration. When this salt makes contact with the uranium alloy, metals in the alloy exchange with uranium halide in the salt.

Table 1 shows the % of each metal component of a typical uranium alloy produced by electro-reduction of spent oxide fuel in a calcium chloride electrolyte when that alloy has been contacted with a 40% uranium trichloride 60% NaCl molten salt in quantities such that the total plutonium and higher actinide content of the alloy was equal to 50 mol % of the uranium chloride in the salt. Calcium and other reactive metals including most of the lanthanides exchange almost quantitatively with the uranium chloride with the metals moving into the salt phase and uranium moving from the salt phase into the uranium alloy.

Plutonium and americium partially transfer into the salt phase while the more noble metals, including neptunium and curium remain substantially in the uranium alloy. Repeated over many counter-current stages this will result in the plutonium and americium moving almost quantitatively into the salt phase along with the calcium, lanthanides etc.

TABLE 1

|    | % in metal |
|----|-----------|
| Sb | 0.00 |
| Se | 0.00 |
| Ba | 0.00 |
| Sr | 0.00 |
| Ca | 0.00 |
| Eu | 0.00 |
| Sm | 0.01 |
| La | 0.05 |
| Pr | 0.12 |
| Ce | 0.14 |
| Nd | 0.34 |
| Cs | 0.36 |
| Pm | 0.40 |
| Rh | 0.75 |
| Gd | 1.08 |
| Te | 1.58 |
| Dy | 3.68 |
| Tb | 5.25 |
| Y  | 6.56 |
| Pu | 22.96 |
| Am | 67.83 |
| Rh | 95.99 |
| Np | 99.68 |
| Zr | 99.98 |
| In | 99.99 |
| Cm | 100.00 |
| Ag | 100.00 |
| Ru | 100.00 |
| Nb | 100.00 |
| Sn | 100.00 |
| Pd | 100.00 |
| Mo | 100.00 |
| Tc | 100.00 |

The molten salt output of this process is a mixture of actinide halides with other halides which can be used without further processing in a molten salt fuelled reactor. The plutonium content of the output fuel can be readily adjusted by changing the ratio of uranium alloy to uranium salt in the counter-current contactor. The residual uranium alloy contains the more noble metal fission products and much of the actinides neptunium and curium. It is radioactive but at a relatively low level and given its high density and low heat production it can be stored compactly for future use, likely as breeder material in a nuclear reactor where the contaminants will be acceptable.

Referring again to FIG. 1, the electrolyte in the electro-reducer cell 100 still contains significant amounts of americium and plutonium following removal of the uranium alloy. When the uranium alloy has been wholly or partially drained from the electro-reducing cell, fresh spent oxide fuel is added and the process repeated. This can happen many times with the same electrolyte (i.e. without replacing the electrolyte) until the build-up of fission products in the electrolyte reaches the stage where it substantially changes the electrochemical behaviour of the cell or produces decay heat in excess of what the cell can tolerate. Typically, as much as 100 tonnes of spent fuel can be processed through each tonne of electrolyte.

At this point, when the last batch of uranium alloy has been drawn from the cell, a final and more exhaustive electrolysis is carried out until essentially all the americium and plutonium are reduced to metals leaving an actinide free electrolyte.

This electrolyte is removed from the cell 100 for disposal. The remaining alloy, which will be relatively rich in lanthanides as well as containing the remaining plutonium and americium is passed down a molten metal/molten salt counterflow system (again, optionally, using the apparatus shown in FIG. 2) where the molten salt is a uranium halide based salt. The quantities of the salt and alloy streams are adjusted so that the molar amount of uranium in the salt is equal to a substantial fraction (but less than molar equivalent) of the lanthanides in the alloy.

Some of the lanthanides in the alloy pass into the molten salt, entirely displacing the uranium from the salt into the alloy. The actinide free lanthanide rich salt is then taken for disposal, optionally by adding it to the waste electrolyte, though the high value and low radioactivity of the lanthanides may make their recovery from the salt useful. The remaining alloy, containing essentially all the actinides and a fraction of the lanthanides originally in the alloy may be returned to the electro-reduction cell 100 of FIG. 1 along with a batch of fresh electrolyte.

An alternative treatment of the lanthanide rich alloy is to contact it batchwise or in a counterflow manner with a molten salt formed by partial or complete halogenation of the lanthanide rich alloy. An actinide free, lanthanide rich molten salt phase is produced together with an alloy containing substantially all of the actinides.

The entire process can then be repeated with uranium oxide pellets added to the new electrolyte. The lanthanides and calcium in the alloy resulting from treatment of the lanthanide rich alloy react chemically with the added uranium oxide producing metallic uranium and returning the residual lanthanides to the electrolyte.

The outputs from this process are an offgas stream from the electro-reducer which will be largely noble gasses and oxygen, an actinide free molten salt rich in fission products which will decay relatively quickly to safe levels (~300 years vs 300,000 years when the actinides were present), a uranium alloy containing the noble metal fission products, curium and neptunium and "ready to use" fuel for a molten salt fuelled reactor. The common halides used in such reactors are chlorides and fluorides and either can be used as the basis for the process. Note that use of a chloride based electro-reducer does not prevent use of a fluoride based molten salt/molten metal counterflow apparatus.

This process requires just two pieces of equipment, readily integrated into a single system and few transfers. It is thus radically simpler than any pyroprocessing method previously reported.

While the process has been described using uranium oxide based spent fuel as the feedstock, the same process can be used for other spent fuel forms. Metallic fuels can be added directly to the electro reducing cell, where electro-reduction of compounds of actinides with fission products will convert all actinides into the metallic form for conversion to molten salt reactor fuel in the second stage of the process. Molten actinide halide salt fuel can also be reprocessed by the same method except that the offgas stream will be chlorine or fluorine rather than oxygen.

Process Throughput

The rate limiting step of the process is the electro-reduction and the throughput of that step is directly proportional to the current density that can be achieved.

Electro-refiners such as those used for the EBRII experimental reprocessor can achieve only limited current density before losing their ability to separate species. 100 mA/cm$^2$ is considered a good result. The electro-reducer does not suffer from this limitation. Its current density is controlled by the point where high electrode potentials cause undesired chemical reactions. At the anode, this is the production of chlorine or fluorine as well as oxygen which requires a very substantial over-potential. At the cathode, it is the reduction of calcium and lanthanide species as well as uranium, though both reactions will be reversed by simple chemical reaction with uranium oxide and can therefore be tolerated to a substantial degree.

Current densities of 1 A/cm$^2$ are readily achievable and are comparable to those routinely achieved in aluminium smelters.

An exemplary 1 m diameter, pilot scale, electro-reducer has a cathode area of 7850 cm$^2$ and thus achieves a current at 1 A/cm$^2$ of 7850 A.

A Faraday is the quantity of electrons equivalent to 1 mole. 4 Faradays are required to reduce 1 mole of $UO_2$ to uranium metal since the uranium is tetravalent, 1 Faraday is equal to 26.8 Amp.hours so the exemplary 1 m diameter cell would produce:

7850/4/26.8=73 mol of uranium per hour

This is equivalent to 19.7 kg of $UO_2$ per hour or 172 tonne per annum. Converted to molten salt fuel at 20% $PuCl_3$ this corresponds to 0.6 tonne of plutonium and 2.2 tonnes of full strength fuel per year.

Scaling up of the process is relatively straightforward. The limiting factor is criticality concerns given the relatively high fissile concentrations achieved in the output fuel salt. This can be avoided by avoiding vessels large enough to allow criticality. The molten salt fuel output is the only composition with potential to achieve criticality and it can be directly packaged in criticality proof storage containers. Careful adjustment of the flow conditions in the counter-current apparatus of FIG. 2 can result in sufficiently precise control of the output fuel salt composition to allow it to be directly packaged into fuel assemblies, thereby eliminating any need for re-melting, blending and re-packaging. Flow conditions can also be automatically adjusted based on the output of an electrochemical sensor in the output molten salt stream.

Reuse of Waste Electrolyte

A consequence of the process for conversion of spent nuclear fuel to molten salt reactor fuel is that the waste electrolyte, after reuse many times, contains the major heat producing fission product isotopes in a highly concentrated form. This indeed may ultimately limit the reuse of the electrolyte.

The spent electrolyte has a high heat production capacity. Depending on the amount of spent nuclear fuel processed through it, this may be as high as 100-500 times the heat production per tonne of the input spent fuel. Depending on the time since the spent fuel was removed from the reactor this could be of the order of 100 kW per tonne.

The spent electrolyte can optionally be rendered substantially non corrosive to standard steels by addition of small amounts of metallic zirconium or other reactive metal. Adding a metal whose salt is a major constituent of the electrolyte can be particularly advantageous as such metals have substantial solubility in their own molten salt and thus provide excellent corrosion control. The heat producing salt is packaged in suitable containers which can be welded closed with a gas space inside to allow for expansion of the salt. Stainless steel is one suitable container.

This salt has a heat generation capacity high enough to be of practical value but has a high emission of radiation. For optimum power production, its temperature should be around 600° C. or more so that it can power a standard high efficiency superheated steam cycle, though other options for conversion of the heat to electric power such as Stirling engines, thermoelectric apparatus, Brayton cycle engines etc may be preferred for certain purposes. It should also be effectively screened against its emissions of gamma radiation.

Figure 3:
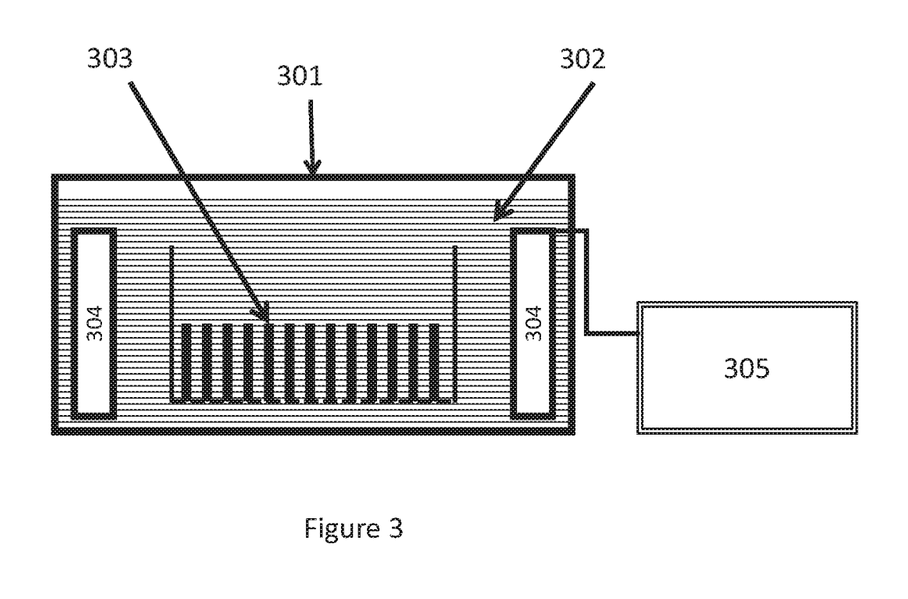
FIG. 3 is a schematic diagram of an apparatus for generating electricity.
Figure 4:
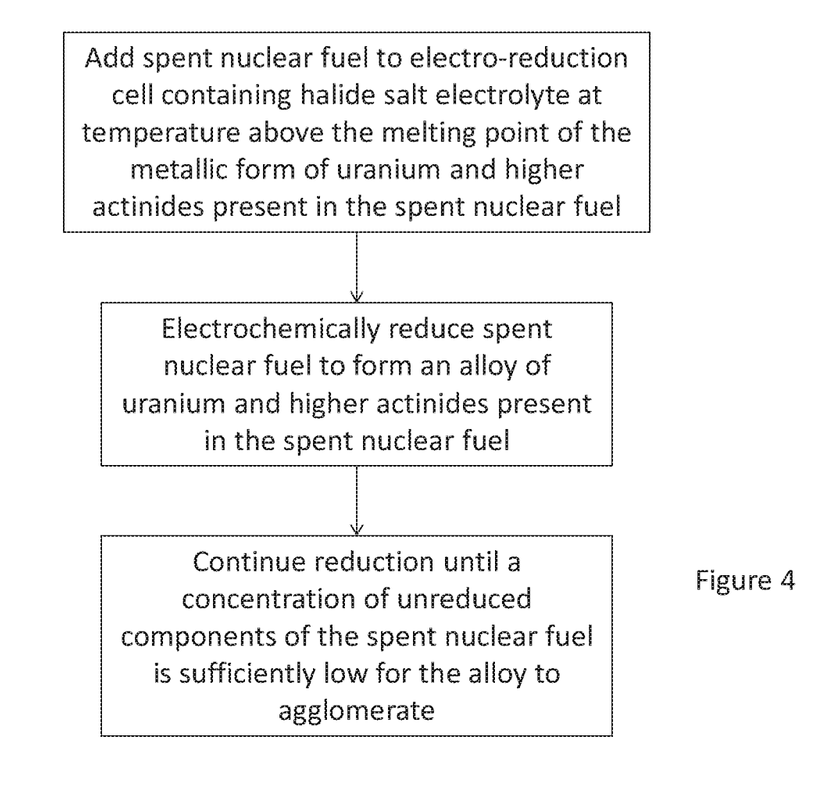
FIG. 4 is a flow chart illustrating a method of reprocessing spent nuclear fuel.

A suitable apparatus to utilise this heat source is shown in FIG. 3, The apparatus comprises a tank 301 containing a heat storage medium 302 in which the heat generating spent electrolyte salt containers 303 are immersed. Heat exchangers 304 are also immersed in the heat storage medium, and may be connected to electricity generators 305 or the heat may be used directly as "process heat". Particularly useful media are "solar salt" which is a mixture of sodium and potassium nitrates or alternative salts such as Hitec salt. The molten solar salt can optionally be bulked out with cheap solid materials such as crushed rock, Other media such as high temperature oils are also suitable though radiolysis by the gamma radiation from the heat source would limit their practical life.

Heat exchangers around the periphery of the tank allow the heat in the solar salt to be transferred to a working fluid for the turbo-generator set. Flow of solar salt in the tank is ideally via natural convection resulting in no moving parts internal to the tank though pumped flow is an option. The large volume of the solar salt provides an effective radiation screen but also gives the apparatus a high thermal inertia so that if the heat source emits heat at, say, 100 kW continually, the turbogenerator can withdraw heat at double that rate for part of the day. This power output variation is especially important when an apparatus such as this is used in remote communities where other methods of production/demand management are difficult to achieve.

Waste heat from the turbo-generator can be discarded or used for heating if a distribution system exists.

The coolant in the tank can also be used directly as a source of process heat.

Example 1—Conversion of Spent CANDU Reactor Fuel into Fuel for Molten Salt Reactor Chemical Decladding Intact spent CANDU fuel assemblies are chemically declad in a stream of HCl gas at 400° C. Zirconium in the Zircalloy 4 alloy is converted to gaseous $ZrCl_4$ (B.Pt. 331° C.) and collected in a condenser. Also released into the gas phase is the filling gas in the fuel cladding void together with minor amounts of fission gasses not trapped in the oxide pellet—primarily xenon and krypton. The HCl does not attack the oxide pellet to a significant degree leaving most fission products contained within the pellet.

The three minor alloying metals in Zircalloy 4 (Fe, Sn and Cr) behave differently during this process. The Fe and Cr form dichlorides which are non-volatile and therefore remain as finely divided solids. The Sn forms $SnCl_2$ which has a significant vapour pressure at 400° C. and is therefore substantially carried over with the $ZrCl_4$.

Graphite from the CANLUB lubricant remain as flakes. Small amounts of complex carbides of Zr and iodine do however form in CANLUB in spent CANDU fuel and small amounts of volatile species of carbon and iodine will therefore be generated. These are mostly recovered as trace contaminants in the $ZrCl_4$ condensate. Excess HCl is condensed and recycled into the hydrochlorinator leaving the offgas comprised almost entirely of $H_2$ and noble gasses.

The small amounts of fine residual solids from the cladding (graphite, iron and chromium chlorides) are collected separately from the relatively large fuel pellets for disposal as low level waste.

This process is similar to the Zircex process, ORNL/TM-12104). It is particularly advantageous for producing fuel for reactors using zirconium tetrafluoride in their coolant as the major waste stream from decladding is mildly radioactive $ZrCl_4$ which is easily converted to $ZrF_4$ by gas phase reaction with HF, The $ZrF_4$ will have an immediate market as coolant salt for the reactor. The ~1% Sn contamination can be removed by distillation or chlorination but removal is unlikely to be necessary as $SnF_2$ would be an acceptable minor contaminant in the coolant salt.

This recycling of the Zircalloy cladding into useful materials eliminates a substantial fraction of the mass and volume of radioactive waste requiring disposal.

Mechanical decladding is however an alternative,

Electrochemical Reduction

Fuel pellets are fed directly into the electro-reducer. This is a high temperature electrolysis cell, operating at 1200° C. with a $CaCl_2$/1% CaO electrolyte with a current density of 1 A/cm². The cathode is molten uranium metal and the cell operates semi-continuously with regular addition of oxide pellets until the desired amount of molten uranium has accumulated. At that time, addition of uranium oxide is stopped and electrolysis continued. During this stage, the majority of the higher actinides are reduced from oxychlorides to metal as are a fraction of the lanthanides.

When the desired degree of actinide reduction has been achieved, electrolysis is stopped and the molten uranium alloy, which now contains the higher actinides and a fraction of the lanthanides as alloy components, is drained from the electrolysis cell. Fresh uranium oxide pellets are then added and the cycle repeated. Up to 100 cycles are practical before the electrolyte requires replacement. The replacement frequency is determined by the increasing heat production from the accumulated decay products and will therefore be affected by the age of the spent fuel pellets.

When the electrolyte requires replacement, a more complete electrolysis is carried out to recover essentially all of the remaining actinides, a larger amount of the lanthanides and a small amount of calcium reduced from the CaO component of the electrolyte and soluble in the alloy. The remaining actinide free electrolyte is then withdrawn and replaced. Uranium oxide pellets are then added and allowed to react with the uranium/actinide/lanthanide/calcium alloy remaining in the electrolysis cell. The majority of the higher actinides, lanthanides and calcium in the molten alloy redissolve in the fresh electrolyte as chlorides and oxychlorides, Electrolysis is then recommenced as above and repeated through up to 100 cycles.

Eventually, accumulation of lanthanides in the cell after many repeats of the 100 cycle process necessitates the removal of the alloy formed during the more exhaustive electrolysis stage. This alloy is passed through a counterflow molten alloy/molten salt column against a flow of 60% NaCl/40% uranium trichloride where the equivalents ratio of lanthanides in the alloy to uranium trichloride in the salt is 1.2. The output of this process is a lanthanide rich salt and an alloy of uranium, higher actinides from the input alloy and a fraction of the lanthanides from the original alloy. This is returned to the electro-reducing cell with fresh electrolyte and spent fuel pellets.

The electro-reducing cell is provided with induction heaters at the base and air cooling coils around the sides. Initially, the heaters are required to maintain the cell at operating temperature but as the volume of waste processed increases, heating from the fission product decay heat and resistance heating of the electrolyte will suffice to maintain the temperature. The air cooling coils manage excess decay heat and ensure a continual convective circulation of the electrolyte across the uranium cathode surface and through the iridium anode. The need for mechanical mixing is thereby avoided.

The apparatus is constructed from yttria coated tantalum.

Conversion of Uranium Alloy to Molten Salt Fuel

The molten uranium alloy is passed directly into a counter-flow liquid-liquid extractor, where it repeatedly contacts a molten salt phase with initial composition of 60% NaCl, 40% $UCl_3$. The extractor is fabricated from yttria coated tantalum. The $UCl_3$ is natural uranium, i.e. uranium with the same isotopic ratio as found in nature. The more reactive metals in the molten alloy phase react with the $UCl_3$, producing metal chlorides and uranium metal.

The flow rates of the molten alloy and salt are adjusted so that for every 1 mol of Pu metal entering the apparatus, 2 mol of $UCl_3$ enter.

The electrochemical reduction stage and alloy conversion stages are integrated into a single apparatus with transfer of molten alloy carried out using a dip tube and gas pressure.

Flow Diagram and Material Balances

The material balances resulting from the process above are given in the following tables,

TABLE 2

Material balance in decladding process

| | kmol per 100 tonne uranium oxide | | | |
|---|---|---|---|---|
| | Input | Solid residue | Condensed ZrF4 fraction | GAS |
| Zr | 93.44 | 0.01 | 93.43 | |
| Fe | 0.31 | 0.31 | 0.00 | |
| Sn | 0.83 | 0.02 | 0.81 | |
| Cr | 0.17 | 0.17 | 0.00 | |
| C | 5.23 | 5.23 | 0.00 | |
| H2+ traces | | | | 177.67 |

TABLE 3

Final Fuel salt composition

| | Mol % |
|---|---|
| NaCl | 59.24 |
| PuCl3 | 15.52 |
| UCl3 | 12.51 |
| CaCl2 | 3.76 |
| CeCl3 | 3.54 |
| NdCl3 | 1.84 |
| PrCl3 | 1.48 |
| YCl3 | 1.27 |
| AmCl3 | 0.57 |
| LaCl3 | 0.13 |
| GdCl3 | 0.11 |
| PmCl2 | 0.02 |
| NdCl2 | 0.02 |
| AmCl2 | 0.01 |

TABLE 4

Composition of uranium alloy and % reduction by element

| Metal | (mol %) | % reduction | Metal | (mol %) | % reduction |
|---|---|---|---|---|---|
| U | 14168.31 | 99.18 | Np | 0.279991 | 100.00 |
| Pu | 49.39085 | 86.50 | Gd | 0.275514 | 50.93 |
| Zr | 26.92022 | 99.95 | Nb | 0.079 | 100.00 |
| Mo | 23.837 | 100.00 | Pm | 0.042208 | 10.93 |
| Ru | 14.69492 | 100.00 | Cs | 0.009141 | 0.07 |
| Ca | 9.519614 | 0.04 | Sm | 0.007211 | 0.20 |
| Ce | 8.969289 | 69.39 | Rb | 0.007048 | 0.26 |
| Pd | 8.011 | 100.00 | Tb | 0.007 | 100.00 |
| Tc | 5.652 | 100.00 | In | 0.005999 | 99.98 |
| Nd | 4.698729 | 25.63 | Sn | 0.005718 | 2.10 |
| Am | 4.128107 | 72.42 | Dy | 0.004 | 100.00 |
| Pr | 3.752635 | 65.26 | Eu | 0.000263 | 0.03 |
| Y | 3.41317 | 93.10 | Sr | 0.000137 | 0.00 |
| Cm | 0.569823 | 99.97 | Ba | 5.96E−05 | 0.00 |
| Rh | 0.369758 | 16.83 | Te | 5.75E−06 | 0.00 |
| La | 0.324627 | 5.24 | Se | 1.44E−10 | 0.00 |
| Ag | 0.318999 | 100.00 | Sb | 6.11E−18 | 0.00 |

The invention claimed is:

1. A method of reprocessing spent nuclear fuel, the method comprising:
    adding the spent nuclear fuel to an electro-reduction cell containing a halide salt electrolyte at a temperature above the melting point of the metallic form of uranium and higher actinides present in the spent nuclear fuel;
    electrochemically reducing the spent nuclear fuel to form a first molten alloy of uranium and higher actinides present in the spent nuclear fuel; and
    removing the first molten alloy from the electro-reduction cell and flowing the first molten alloy removed from the electro-reduction cell in one direction and counter-flowing a molten salt comprising a uranium halide in the opposite direction in contact with the first molten alloy so as to form a second molten alloy that is higher in uranium concentration than the first molten alloy by reduction and addition of uranium into the second molten alloy from the uranium halide within the molten salt.

2. The method according to claim 1, wherein the spent nuclear fuel comprises one or more of:
    uranium oxide;
    plutonium oxide;
    uranium metals;
    actinide halide salts.

3. The method according to claim 1, further comprising electrochemically reducing the spent nuclear fuel until at least a quarter of plutonium initially present in the spent nuclear fuel is in the first molten alloy before removing the first molten alloy from the electro-reduction cell.

4. The method according to claim 1,
    wherein the flowing the first molten alloy removed from the electro-reduction cell in the one direction and the counter-flowing the molten salt comprising the uranium halide in the opposite direction in contact with the first molten alloy also forms a molten salt fissile fuel.

5. The method according to claim 4, wherein the flow rates of the first molten alloy and molten salt are such that the number of moles of uranium halide in the molten salt passing through the process in a unit time is greater than the number of moles of higher actinides plus lanthanides in the first molten alloy passing through the process in a unit time.

6. The method according to claim 4, wherein the molten salt comprising uranium halide consists of 60% sodium halide and 40% uranium halide, and the uranium halide is natural uranium.

7. The method according to claim 4, wherein the first molten alloy and molten salt are counter-flowed in contact with each other in a counter-current exchanger.

8. The method according to claim 1, wherein the steps of adding the spent nuclear fuel, electrochemically reducing the spent nuclear fuel and removing the first molten alloy from the electro-reduction cell are performed multiple times using the same electrolyte.

9. The method according to claim 8 and comprising performing exhaustive electrolysis in order to eliminate actinides from the electrolyte following a final step of electrochemically reducing the spent nuclear fuel, the exhaustive electrolysis resulting in a third molten alloy comprising plutonium, americium and lanthanides.

10. The method according to claim 9, and comprising flowing the third molten alloy comprising plutonium, americium and lanthanides in one direction and flowing a molten salt in the other direction in contact with said third molten alloy, wherein the molten salt comprises uranium halide in an equivalent or lesser concentration to a concentration of lanthanides and other non-actinide metals in the third molten alloy, such that following the contacting of the third molten alloy with the molten salt, the molten salt is substantially actinide free.

11. The method according to claim 9, wherein the resulting electrolyte is used as a heat source for a heat exchanger for generating electricity or process heat.

12. The method according to claim 11, wherein the electrolyte is stored within leak-proof thermally conductive containers of stainless steel or other material resistant to corrosion by molten salt, and immersed in coolant contained within a coolant tank, wherein the heat exchanger is partly immersed in said coolant.

13. The method according to claim 12, wherein the coolant is a molten salt.

14. The method according to claim 13, wherein the coolant is a nitrite or nitrate.

15. The method according to claim 13, wherein the size of the coolant tank is such that each of the containers is surrounded by sufficient coolant to screen radiation emitted by the electrolyte.

16. The method according to claim 1, wherein the first molten alloy comprises lanthanides from the spent nuclear fuel.

17. The method according to claim 16, wherein the addition of uranium into the second molten alloy comprises displacing some of the lanthanides in the first molten alloy with uranium from the molten salt.

* * * * *